US012694045B2

(12) United States Patent　　　　(10) Patent No.:　US 12,694,045 B2
Ahmadi et al.　　　　　　　　　　　　(45) Date of Patent: 　　　Jul. 28, 2026

(54) ADAPTIVE RANKING OF NAVIGATION SUGGESTIONS

(71) Applicant: Google LLC, Mountain View, CA (US)

(72) Inventors: Mohamad Hasan Ahmadi, Santa Monica, CA (US); Jun Zou, Bothell, WA (US); Angela Alison Yoeurng, Pasadena, CA (US); Justin Gabriel Donnelly, Westlake Village, CA (US); Tommy Chendong Li, Santa Monica, CA (US); Tarun Bansal, Seattle, WA (US); Manuk Armen Hovanesian, Glendale, CA (US); Michael Blair Crouse, Seattle, WA (US); Sophie Chang, Seattle, WA (US); Yana Yushkina, Seattle, WA (US); Jesse Hong Lee, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/362,590

(22) Filed: Jul. 31, 2023

(65) Prior Publication Data

US 2025/0045305 A1　　Feb. 6, 2025

(51) Int. Cl.
　　*G06F 16/332*　　　(2019.01)
　　*G06F 16/334*　　　(2025.01)
　　*G06N 20/00*　　　(2019.01)
(52) U.S. Cl.
　　CPC ...... *G06F 16/3322* (2019.01); *G06F 16/3346* (2019.01); *G06N 20/00* (2019.01)

(58) Field of Classification Search
　　None
　　See application file for complete search history.

(56) References Cited

U.S. PATENT DOCUMENTS

| | | | |
|---|---|---|---|
| 8,244,721 B2 * | 8/2012 | Morris | G06F 16/90335 |
| | | | 707/723 |
| 9,870,423 B1 * | 1/2018 | Bousquet | G06F 16/951 |
| 10,546,026 B2 * | 1/2020 | Pulbere | G06F 16/24578 |
| 10,936,632 B2 * | 3/2021 | Somaiya | G06F 16/90324 |

(Continued)

OTHER PUBLICATIONS

Personalized Query Auto-Completion for Large-Scale POI Search at Baidu Maps (Year: 2020).*

(Continued)

*Primary Examiner* — Kim T Nguyen
(74) *Attorney, Agent, or Firm* — Brake Hughes Bellermann LLP

(57)　　　　　　　ABSTRACT
A method is disclosed for providing autocomplete suggestions for a navigation text box. The method includes receiving an input in the navigation text box and obtaining candidate navigation suggestions from a retrieval source. Respective signals are obtained for the candidate navigation suggestions, and respective probability scores are obtained by providing the input, candidate navigation suggestions, and signals to a navigation suggestion ranking model. The probability scores reflect a prediction of the likelihood of selection. Based on their respective probability scores, at least some candidate navigation suggestions are provided as autocomplete suggestions for the input. This method enhances user experience by offering relevant and personalized navigation suggestions in real-time, improving efficiency and accuracy in navigation tasks.

20 Claims, 5 Drawing Sheets

(56)  References Cited

U.S. PATENT DOCUMENTS

| | | | | |
|---|---|---|---|---|
| 10,936,678 | B2 * | 3/2021 | Pulbere | G06F 16/334 |
| 11,210,718 | B1 * | 12/2021 | Engelbart | G06Q 30/0641 |
| 11,379,227 | B2 * | 7/2022 | Rao | G06F 16/2453 |
| 11,514,122 | B1 * | 11/2022 | S | G06F 16/9538 |
| 11,880,880 | B1 * | 1/2024 | Liu | G06Q 30/0633 |
| 12,229,780 | B2 * | 2/2025 | Zhao | G06F 16/338 |
| 12,235,912 | B1 * | 2/2025 | Anushiravani | G06F 16/3322 |
| 12,353,670 | B2 * | 7/2025 | Rudchenko | G06F 3/013 |
| 12,393,581 | B2 * | 8/2025 | Petersen | G06F 16/24522 |
| 12,499,163 | B2 * | 12/2025 | Anushiravani | G06F 16/3322 |
| 12,579,158 | B1 * | 3/2026 | Shah | G06F 16/248 |
| 2006/0026509 | A1 * | 2/2006 | Porter | H04L 41/22 715/275 |
| 2009/0204599 | A1 * | 8/2009 | Morris | G06F 16/90335 707/999.005 |
| 2011/0072033 | A1 | 3/2011 | White et al. | |
| 2013/0290875 | A1 * | 10/2013 | Dixit | G06F 11/3698 715/762 |
| 2017/0242898 | A1 * | 8/2017 | Su | G06F 16/951 |
| 2018/0285457 | A1 * | 10/2018 | Pulbere | G06F 16/9538 |
| 2019/0171675 | A1 * | 6/2019 | Pulbere | G06F 16/951 |
| 2020/0372019 | A1 * | 11/2020 | Tokarev Sela | G06F 16/2425 |
| 2022/0107802 | A1 * | 4/2022 | Rao | G06F 16/907 |
| 2022/0155912 | A1 * | 5/2022 | Rudchenko | G06F 3/0237 |
| 2025/0045305 | A1 * | 2/2025 | Ahmadi | G06F 16/3322 |
| 2025/0068630 | A1 * | 2/2025 | Lelakowski | G06F 16/24542 |
| 2025/0068680 | A1 * | 2/2025 | Anushiravani | G06F 16/3322 |
| 2025/0110997 | A1 * | 4/2025 | Anushiravani | G06F 16/3322 |
| 2025/0147953 | A1 * | 5/2025 | Draese | G06F 16/90324 |
| 2025/0371086 | A1 * | 12/2025 | Sipolins | A63F 13/47 |
| 2026/0037822 | A1 * | 2/2026 | Jain | G06N 3/0499 |
| 2026/0057013 | A1 * | 2/2026 | Inoue | G06F 16/9035 |

OTHER PUBLICATIONS

Learning to Personalize Query Auto-Completion (Year: 2013).*
Personalizing Web Search using Long Term Browsing History (Year: 2011).*
International Search Report and Written Opinion for PCT Application No. PCT/US2024/039120, mailed on Nov. 12, 2024, 12 pages.
Hartmann, et al., "Federated Learning for Ranking Browser History Suggestions", arXiv: 1911.11807v1, Nov. 26, 2019, 9 pages.

* cited by examiner

500

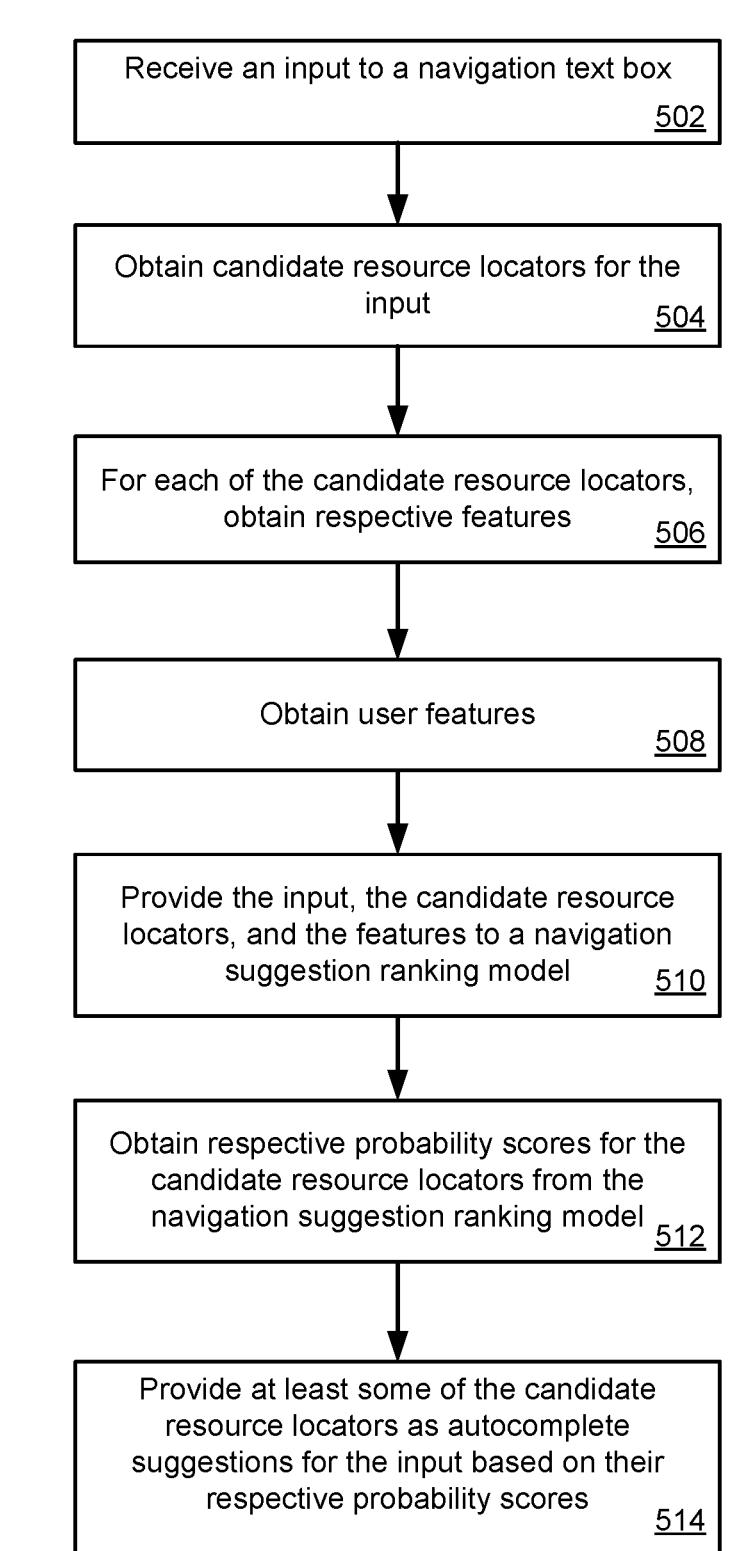

Receive an input to a navigation text box
502

Obtain candidate resource locators for the input
504

For each of the candidate resource locators, obtain respective features
506

Obtain user features
508

Provide the input, the candidate resource locators, and the features to a navigation suggestion ranking model
510

Obtain respective probability scores for the candidate resource locators from the navigation suggestion ranking model
512

Provide at least some of the candidate resource locators as autocomplete suggestions for the input based on their respective probability scores
514

FIG. 5

ADAPTIVE RANKING OF NAVIGATION SUGGESTIONS

BACKGROUND

Browsers include a text box that enables a user to enter a resource locator, e.g., a URL or URI, to navigate to a particular resource, such as a website. In some browsers, this navigation text box may have dual capabilities; enabling a user to navigate to a website or to initiate an Internet search. Such a navigation and search text box can be referred to as an omnibox. Browsers can provide suggestions to the user as the user types into the navigation text box or the combined navigation/search text box.

SUMMARY

This application relates to a system that provides a novel ranking process for navigation suggestions in response input provided in a combined navigation/search text box, which results in higher quality suggestions. In particular, implementations enable a browser to use an on-device model to more accurately rank candidate resource locator suggestions to help users more quickly navigate to an intended resource. The more accurate rankings lower typing duration and lower typed length, thereby conserving resources on the user device. The on-device ranking model opens the door to adding new signals, automatically adjusting weights with time, and providing improved on-device personalization that leads to advances in both the precision and the recall for navigation suggestions.

According to an aspect, the techniques described herein relate to a method including: receiving an input in a navigation text box; obtaining candidate navigation suggestions from a retrieval source for the input; obtaining respective signals for the candidate navigation suggestions; obtaining respective probability scores for the candidate navigation suggestions by providing the input, the candidate navigation suggestions, and the respective signals to a navigation suggestion ranking model, the respective probability scores representing a prediction of a likelihood of selection; and providing at least some candidate navigation suggestions based on their respective probability scores and as autocomplete suggestions for the input.

According to an aspect, the techniques described herein relate to a method including: collecting selection events from client devices, the selection events recording selected autocomplete suggestions and signals of autocomplete suggestions provided for partial inputs in a navigation text box, the autocomplete suggestions including navigation suggestions; and training a navigation suggestion ranking model using the selection events, where a selected suggestion of a selection event of the selection events represents a positive example for the autocomplete suggestions of the selection event.

According to an aspect, the techniques described herein relate to a method including: receiving a partial input in a text box used for navigation and search; obtaining candidate navigation suggestions from a retrieval source for the partial input; obtaining respective signals for the candidate navigation suggestions; obtaining respective probability scores for the candidate navigation suggestions by providing the partial input, the candidate navigation suggestions, and the respective signals to a navigation suggestion ranking model, the respective probability scores representing a prediction of a likelihood of selection; providing at least some candidate navigation suggestions based on their respective probability scores and as autocomplete suggestions for the partial input; receiving a selection of an autocomplete suggestion of the autocomplete suggestions; and navigating to a resource represented by the autocomplete suggestion.

According to an aspect, the techniques described herein relate to a system comprising a processor and a memory, such as a non-transitory computer-readable medium, storing instructions that, when executed by the processor, cause the system to perform any of the methods disclosed herein.

The details of one or more implementations are set forth in the accompanying drawings and the description below. Other features will be apparent from the description and drawings, and from the claims.

BRIEF DESCRIPTION OF THE DRAWINGS

FIG. 5 illustrates a flowchart of an example method of using a navigation suggestion ranking model, according to an implementation.

DETAILED DESCRIPTION

Figure 1:
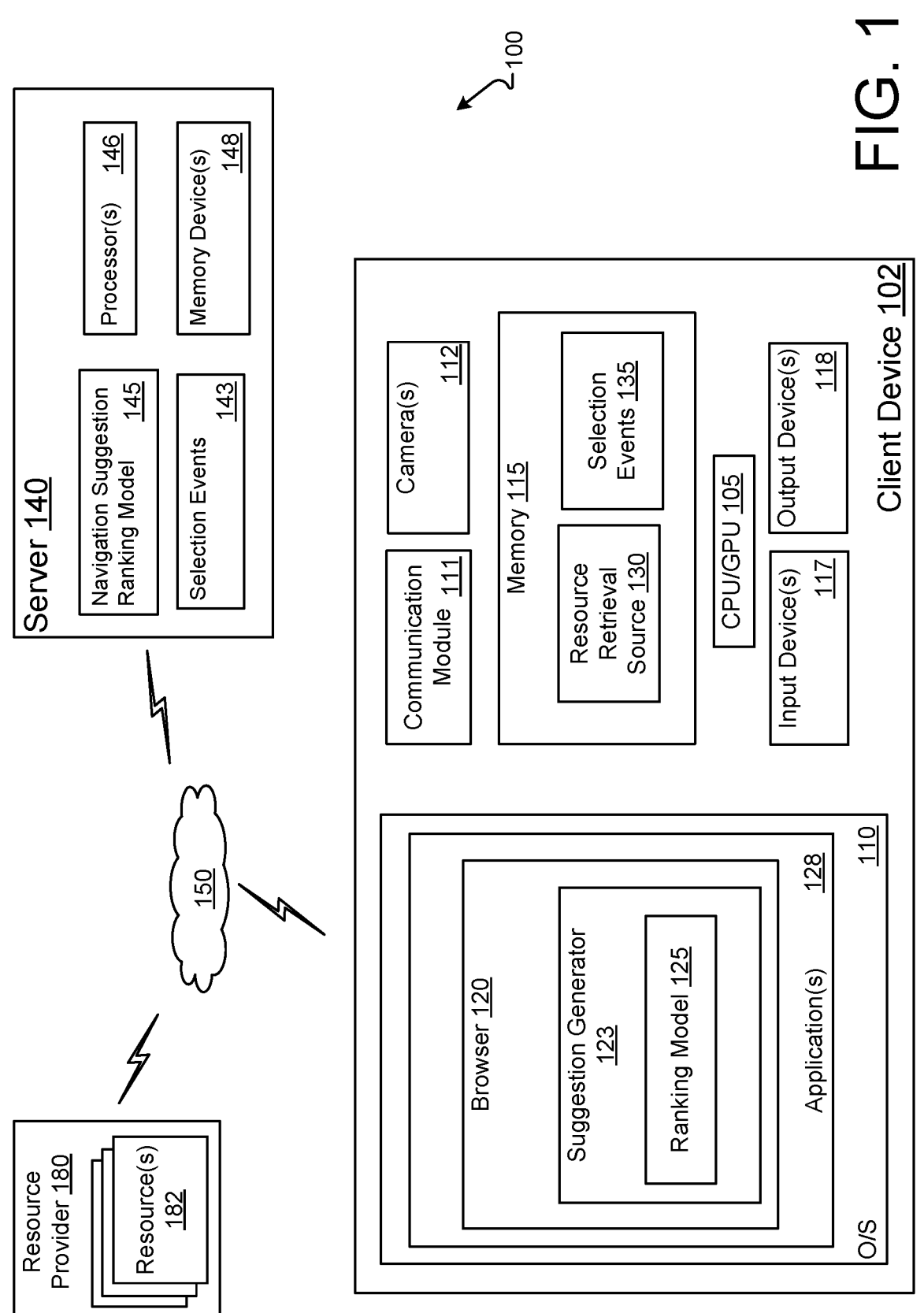
FIG. 1 illustrates a block diagram of an environment for adaptive ranking of navigation suggestions, according to an implementation.

Disclosed implementations provide improved ranking of historical resource suggestions via an on-device machine-learned model. A browser provides a navigation text box that enables a user to navigate to resources, e.g., resources available over a network such as the Internet. Browsers allow users to navigate directly to a resource via a resource locator or by typing text that corresponds with a resource. For example, a user may enter text that starts with a navigation identifier, such as https (the Internet protocol identifier) or www (which identifies the resource as an Internet resource) or the user may type characters that match a domain portion of a resource locator. The browser can provide suggestions for what the user has typed as the user is typing. Many browsers include a combined navigation/search navigation text box (an omnibox), which enables the user to either initiate a search or navigate to a resource. In such browsers the suggestions can include search (query) suggestions and navigation (resource locator) suggestions. Often autocomplete suggestions for input in an omnibox that does not start with a navigation identifier (such as https or www) include at least one search suggestion ahead of any navigation (resource locator, e.g., URL) suggestions. The autocomplete navigation suggestions are often based on a manually created scoring formula that uses a small set of static rules. This static scoring formula makes the addition of new signals difficult (because the process of adding new signals is time consuming and error prone) and does not allow for personalization or adjusting to changes that affect different suggestion types. This results in lower precision (e.g., the user is not presented with a suggestion that matches the user's intent) and lower recall (e.g., the suggestions lack relevant suggestions). Lower precision and recall results in additional typing by the user because the suggestions are of lower quality and often fail to include a suggestion that aligns with user intent. Use of a ranking model enables the model to scale new signals, something hand-curated rules-based ranking does not do, by adding the new signals to the input considered by the model and retraining the model. A ranking model using hand-curated rules limits the number of new signals added at any time. Disclosed implementations train a ranking model to use existing and new ranking signals to provide more accurate predictions (ranking scores) for URLs, which results in higher precision and recall.

Due to difficulties in accounting for new signals and in manually crafting a formula with many signals per source, static rules-based navigation suggestion ranking processes use a limited number of (e.g., less than 10) signals per source. These static rules tend to result in technical problems. One problem is that bookmarks (resource locators saved by the user, also referred to as favorites) tend to dominate navigation suggestions. In other words, if an input is found to match a bookmarked resource (e.g., the title matching, some portion of the resource locator matching), the rule is to boost the score of that resource. This signal works if a user keeps bookmarks up to date, but not if bookmarks are outdated because the boost results in an outdated suggestion the user is not likely to find helpful. For example, if the user researched a trip to New Zealand five years ago and bookmarked two or three websites related to the trip, and the user is now researching a trip to Italy, a current input of 'travel' may result in those five-year-old-bookmarks dominating the navigation suggestions instead of more recently visited websites, leading to suboptimal suggestions (low precision).

Another technical problem with static rules for ranking navigation suggestions is an imbalance between visit frequency and visit recency. In most cases, a website that has been visited more times in the past should be highly ranked, e.g., towards the top of the list of suggested navigations. However, when a user is on a given journey there may be more recently visited sites that are more relevant but have a low visit frequency. A ranking algorithm based on static rules fails to account for these exceptions. For example, a user may frequently visit a review site (e.g., www.reviews-.com) for restaurant reviews to find new places to eat but may have recently visited that review site during the trip to Italy journey. In response to a text input of reviews, where the user wants to get back to the resource relating to Italy, the static rules for ranking may suggest the resources related to restaurants, leading to suboptimal suggestions (low recall).

Another technical problem with static rules-based ranking is an imbalance between typed visits with shortcut visits. A typed visit is a count of the number of times a user navigates to a resource using the navigation text box (e.g., an omni-box). A shortcut visit is a count of the number of times a user navigates to a resource using a particular input in the navigation text box. Because sites that are visited frequently have many typed visits, these sites may be more highly ranked than a site that has a higher correlation with the input in the navigation text box. Thus, for example, if a user frequently navigates to www.sitel.com, this resource may be more highly ranked than a resource that has a title or domain portion that matches the actual input currently typed into the navigation text box. Again, this results in suboptimal suggestions.

Low precision in suggested navigations means that the user is frequently not presented with the desired resource and cannot navigate directly to that resource, which increases the number of webpages rendered by the browser to arrive at the desired resource. For example, rather than beginning the text input with www.review, the user may instead just type review. This may cause any bookmarks saved for that domain to be highly ranked navigation suggestions even if not relevant to the user's current search journey. A search journey is a collection of queries and resources visited that are related to the same topic/entity/vertical. A user typing review in the navigation text box may cause a frequently visited navigation suggestion related to restaurant reviews to be ranked over a more recent navigation suggestion at the domain related to Italy. Both outcomes result in the user having to further interact with the browser before arriving at the desired resource, e.g., by fully typing a query or by selection of a suggested query, which is then submitted to a search engine, which results in a search result page rendered, reviewed by the user and, if the desired resource appears on the search result page, the user can then select the desired resource and navigate to the resource; otherwise the user must try another search. Similarly, low precision may result in mis-ranking of navigation suggestions. This can make it more difficult for the user to find the correct suggestion because it is listed further down the list of suggestions, leading to the extended process (having to identify the resource via a search result page). It can also result in low recall because the preferred suggestion does not make the cutoff and does not appear on the list of suggestions, resulting in the extended process. This extended process (caused by low precision and/or low recall) increases the computational resources consumed by the computing device, such as increased usage of network bandwidth, increased power consumption, etc.

Use of the disclosed ranking model enables more accurate ranking (precision and recall) that addresses the technical problems above. A high precision and recall ranking process, represented by disclosed implementations, decreases the computational resources consumed (e.g., computational resources may be "freed up") and increases the efficiency of the web browser itself. For example, fewer user interactions consume less battery and less bandwidth to navigate to the desired resource. The disclosed ranking model can at least double the number of signals used in ranking candidate suggestions and can efficiently (e.g., within O(100) milliseconds) handle scoring an order of magnitude more candidate resources than static rules-based ranking. The disclosed ranking model can also automatically adjust over time and can quickly be retrained with new signals to further improve precision and recall. In some implementations, use of a ranking model also enables the browser to balance between search and navigation autocomplete suggestions, i.e., it can be trained to combine the ranking of search and navigation suggestions, which allows navigation suggestions to be displayed ahead of search suggestions. Current methods rank at least one search suggestion (and sometimes all search suggestions) ahead of navigation suggestions unless the input starts with a navigation identifier. For at least these reasons, disclosed implementations support a user's search for content and assist the user in searching for the content by a continued and/or guided human-machine interaction process.

FIG. 1 illustrates an example environment 100 for providing one or more autocomplete suggestions in response to a text input in a navigation text box (including a combination navigation/search text box). The navigation suggestion ranking model 145 of disclosed implementations is trained to predict a likelihood of a candidate resource being selected when presented as an autocomplete suggestion for the text input. A candidate resource is a resource being considered as an autocomplete navigation suggestion for the input entered by the user in the navigation text box. A navigation text box is a text input field used for navigation or for navigation and search. The candidate resources can be obtained from various sources or from a single source. The navigation suggestion ranking model 145 makes the prediction based on a plurality of signals describing the candidate resource. The signals describing the candidate resource can include resource-specific signals and matching signals. In some implementations, the signals can include signals describing a user and/or signals describing the input. Once trained, the navigation suggestion ranking model 145 can be pushed to (downloaded to user devices, such as client device 102), and executed on the client device 102 as local ranking model 125. In some implementations, the client device 102 may personalize the local ranking model 125 by further training the ranking model 125 with selection events captured for the user on the client device 102. The personalization can make the predictions of the local ranking model 125 more accurate for the user of the client device 102. The user may be a user identified by a user profile. Thus, the client device 102 can include two or more instances of the local ranking model 125, each associated with a respective user profile. Although the following description indicates that some of the operations are performed by the server 140, in some implementations, these operations may be performed by the browser 120 executing on the client device 102.

Environment 100 includes server 140. Server 140 may be a computing device or computing devices that take the form of a number of different devices, for example a standard server, a group of such servers, a distributed computing system such as a rack server system. One or more of the components of the server 140 can be, or can include, processors 146 configured to process instructions stored in a memory, such as memory devices 148. The server 140 may be associated with a developer of a browser, such as browser 120. The server 140 may be programmed to collect, with user permission, selection events 143. The server 140 may be programmed to use the selection events 143 to train a navigation suggestion ranking model 145. A selection event captures text input entered into a navigation text box, autocomplete suggestions presented to the user based on the text input, signals describing attributes of the autocomplete suggestions, and/or signals describing an interaction of the user with the autocomplete suggestions or a lack of interaction with the autocomplete suggestions. Some implementations may also include signals relating to the user in one or more selection events. The signals captured in the selection events 143 are privacy-preserving signals. Put another way, the signals capture attributes of the text input, the autocomplete suggestions, and interactions with the autocomplete suggestions in a manner that does not identify a user, using numbers representing quantities, ratios, and flags that cannot be traced back to any particular user. For example, a signal may indicate whether or not a resource is present in a user's bookmarks. As another example, signals for the user may be generalized, e.g., a location may be generalized to a city, to a state, or to a country so a particular location of a user cannot be determined. As another example, a signal may represent the user's membership in a generalized cohort, such as power user or casual user, without identifying any particular set of user interests or characteristics.

Moreover, the user may be provided with controls allowing the user to make an election as to both if and when the environment 100 and/or the browser 120 may enable the collection of the selection events 135 and/or of the selection events 143, the adding of an entry to the resource retrieval source 130, and/or whether one or more types of the selection events 135 can be used in training the navigation suggestion ranking model 145 and/or personalizing the local ranking model 125. Thus, implementations provide the user with control over what information is collected, how that information is used, and what information is provided to the user.

The autocomplete suggestions in the selection events 143 can represent navigation suggestions. A resource can be any document available via a network, such as network 150. A resource provider, such as resource provider 180, may host a resource 182 or multiple resources 182. A webserver is an example of a resource provider 180. The webpage(s), image(s), and/or document(s) available via the web server are examples of resource(s) 182. Each resource 182 is identified by a resource locator. The resource locator is an address or other identifier that uniquely identifies the resource 182. Because each resource 182 is associated with a unique resource locator, reference to a resource 182 is understood to also refer to the resource locator, and reference to a resource locator is understood to also refer to its corresponding resource. The resource locator can include an indication of which resource provider 180 hosts the resource 182 and how to access the resource 182 at the resource provider 180. Uniform resource locators (URLs) are example resource locators. A URL includes a domain portion that identifies the resource provider 180. The remaining portion of the URL indicates how to access the resource at the domain, for example www.domain.com/resource. A navigation suggestion is a resource suggested as an autocomplete suggestion. In some implementations, a navigation suggestion may include a title or other text description of the resource in addition to the resource locator, for example Resource Title—www.domain.com/resource.

In implementations where the navigation text box includes a navigation and search text box (an omnibox), the autocomplete suggestions in the selection events 143 can represent search suggestions. A search suggestion is a term or phrase that can be submitted as a query to a search engine. Search suggestions different from navigation suggestions in the response of the browser 120 to selection of the suggestion. In response to a user selecting a search suggestion, the browser sends the suggested query to a search engine, which returns a search result page for the query and the browser presents the search result page. In response to a user selecting a navigation suggestion, the browser navigates to the resource represented by the navigation suggestion, e.g., to a particular resource 182. Often, only a few, e.g., five, seven, ten, etc., autocomplete suggestions are presented to the user as the user enters input into the navigation text box. These few autocomplete suggestions can include a mixture of search suggestions and navigation suggestions. In some implementations, the number of search suggestions and the number of navigation suggestions may be determined by the ranking model, e.g., local ranking model 125.

As mentioned above, the selection events 143 represent many selection events from various users. Because a selection event captures signals describing an interaction of the user with the autocomplete suggestions or a lack of interaction with the autocomplete suggestions, the interaction signals in the selection events 143 can be used as labeled training data for training the navigation suggestion ranking model 145. In some implementations, the server 140 may periodically collect selection events 143 from client devices, such as client device 102, with user permission. This may enable further training of the navigation suggestion ranking model 145. The server 140 may train the navigation suggestion ranking model 145 using the selection events 143. As described below, the selection events 143 include many more signals than static rules-based ranking processes.

In some implementations, the server 140 may be configured to synchronize user actions, browser history, saved resources, resource retrieval source 130, and browser configurations across computing devices (including the client device 102) associated with a user account. For example, a user may bookmark a particular web page using the browser 120 on the client device 102. If other computing devices are associated with the user's account on the server 140, data may be transmitted from the client device 102 to server 140 and on to the other computing devices such that the bookmark also appears in the browser 120 running on the other computing devices. Bookmarks can be one example of a resource retrieval source 130.

The server 140 may provide, over the network 150, the navigation suggestion ranking model 145 to client devices, represented in FIG. 1 by client device 102. At client device 102 the model is stored as a local ranking model 125. The local ranking model 125 can execute on the client device 102 without communicating with the server 140 over the network 150. The network 150 may include the Internet and/or other types of data networks, such as a local area network (LAN), a wide area network (WAN), a cellular network, satellite network, a Wi-Fi network, or other types of data networks or a combination of these. The network 150 may also include any number of computing devices (e.g., computer, servers, routers, network switches, etc.) that are configured to receive and/or transmit data within network 150. Network 150 may further include any number of hardwired and/or wireless connections.

In some implementations, the client device 102 is a mobile computing device such as a mobile phone, tablet, or personal digital assistant. In some implementations, the client device 102 is a personal computing device, such as a laptop or desktop computer or a smart TV. The client device 102 can also be referred to as a user device. In some implementations, the client device 102 may be a wearable device, such as AR/VR glasses or goggles or a smart watch. The client device 102 includes a network interface (e.g., communication module 111) configured to connect the client device 102 to the network 150 (e.g., the Internet). The network interface may include a mobile network interface and/or Wi-Fi network interface. The client device 102 may include any number of input devices 117 and/or output devices 118. Input devices 117 may enable a user to interact with the client device 102, e.g., to provide input to a navigation text box of a browser 120 and/or to select a suggested resource or suggested query. Example number of input devices 117 include a keyboard, a mouse, a stylus, a touchscreen, a microphone, a camera 112, etc. The output devices 118 enable the client device 102 to provide information to the user and can include a display (including a touchscreen), a speaker, LED indicators, etc.

One or more of the components of the client device 102 can be, or can include a processor(s) 105 configured to process instructions stored in a memory, such as memory devices 115. The client device memory devices 115 may store application data, such as selection events 135 and resource retrieval source 130. The resource retrieval source 130 represents data collected by the browser 120 related to browsing history for a user profile. The retrieval source 130 can represent different sources. For example, one example resource retrieval source is a collection of user-saved resources, often referred to as bookmarks or favorites.

Another example of a resource retrieval source is a browser history. A browser history stores, with user permission, resource locators (URLs) visited by the user profile. A date that the user visited the resource may also be recorded in the browser history. Another example of a resource retrieval source is a shortcut history. In some implementations, the browser 120, with user permission, may record what resource locator was selected by a user in response to a text input. In some implementations, the shortcut history may be part of the selection events 135. In some implementations, the resource retrieval source 130 may be an aggregation of information, including signals, generated for various resources. For example, the browser 120 may generate a resource database using information from the browser history, the saved resources, and/or from a shortcut history. The resource database may store resource-specific signals generated for the resources to speed the suggestion generation process. In some implementations, the browser 120 may update the signals after (in response to) a navigation. In some implementations, the browser 120 may update the signals in response to a selection event.

The client device 102 may include an operating system 110 and one or more applications 128. An application is a set of instructions stored in a memory that are executable by the processor(s) 105 to perform operations. The applications 128 can include the browser 120. The browser 120 is an application designed to communicate with other computing devices, such as resource provider 180 and server 140, to fetch and render content of resources 182, etc. The browser 120 may acquire the content of a resource 182 by loading a native library of the browser 120, performing a domain name system (DNS) lookup based on the resource locator (URL) associated with a particular resource 182, and downloading the resource content from a resource provider 180. The browser 120 includes a renderer for presenting the resource content to the user, e.g., in a browser tab of a browser window. A browser window can be associated with a profile of a user.

The browser 120 may have tools to support navigation, such as bookmarks, browsing history, etc. Also, the browser 120 may define forward and back buttons to navigate through previously viewed resources (web pages). Through the use of the browser 120, resources (such as web pages) may provide a navigation bar, sitemap, dropdown menu, etc. to navigate to different resources within a domain (e.g., resource provider 180). In some implementations, the browser 120 is a mobile browser designed for use on an operating system of a mobile device. The mobile browser is configured to render and display mobile tabs and/or web pages in a mobile format (or in a desktop format). In some implementations, the browser 120 may be integrated into the operating system 110 (e.g., a browser-based operating system).

The browser 120 be programmed to provide a text input field for navigating to resources, e.g., by enabling the user to enter a resource locator, such as www.domain.com. The text input field is referred to as a navigation text box. This navigation text box is often called an address bar and, when configured to either navigate or search, can also be referred to as an omnibox. Search engine homepages can also provide a text input field used for navigation and search. Thus, a search engine home page can also have a navigation text box configured for navigation and search. Whether input entered into a navigation text box results in navigation or search can depend on the input typed into the field. For example, an input that relates to a navigation identifier, such as www, may cause the browser 120 to attempt to navigate to a resource. If the user types such an input, a suggestion generator 123 of the browser 120 may, as the user types, provide autocomplete suggestions that include only navigation suggestions. An input that does not include a navigation identifier or is not yet long enough to be clearly associated with a navigation identifier may be interpreted as a search request. The browser 120 (e.g., suggestion generator 123) may be configured to provide autocomplete suggestions that include navigation and search suggestions for a search request.

But users often do not preface their input into the input text field (address bar/omnibox) with a navigation identifier even if they intend to navigate to a particular resource. Thus, for example, when the user wants to navigate to www.reviews.com the user may simply start typing reviews. This means that the input entered into the navigation text box can be interpreted as either a navigation or a search input. While the user is typing in the navigation text box the suggestion generator 123 is configured to provide auto-completion suggestions for both navigation and search. Often, a suggestion generator of a browser includes a navigation suggestion ranking process that requests a limited number (e.g., less than ten, often less than five or six) of candidate resource locators (e.g., URLs) from each of the browser history, saved resources, and shortcut history (e.g., various sources that can be included in resource retrieval source 130). The candidate resource locators are deemed relevant to the current input in the navigation text box (omnibox). Each resource retrieval source includes a process for identifying and scoring candidate resource locators (e.g., URLs) from that source. The scoring is typically based on a few (e.g., less than 10) signals applicable to the source. A suggestion generator may combine (merge and sort) the candidate resource locators from the different sources and select some (e.g., one to five) of the highest-scoring candidates as navigation suggestions for the autocomplete suggestions. As outlined above, this process is slow, inaccurate (low precision and recall), and the process for adding new signals is slow and error prone.

Disclosed implementations use the local ranking model 125 as an improved ranking process for the suggestion generator 123. The suggestion generator 123 may use the local ranking model 125 to select and provide one or more autocomplete suggestions in response to input in a navigation text box (e.g., omnibox, address bar). The local ranking model 125 is initially a copy of the navigation suggestion ranking model 145 received from the server 140. The local ranking model 125 can execute on the client device 102 without a network connection. In other words, the local ranking model 125 runs on-device. In some implementations, the local ranking model 125 can be personalized via additional on-device training using selection events 135. The suggestion generator 123 may obtain candidate resources from the retrieval source 130, but instead of a few candidate resources, the suggestion generator 123 may obtain tens of candidate resources or even a hundred candidate resources. The candidate resources are candidate navigation suggestions. In some implementations, the resource retrieval source 130 may store one or more resource signals for a resource. The suggestion generator 123 may use some or all of the signals provided by the resource retrieval source 130. The suggestion generator 123 may obtain (determine, calculate) additional signals for some or all of the candidate resources, such as match signals. The suggestion generator 123 may obtain (determine, calculate) user signals, which describe aspects of the user and/or input signals, which describe aspects of the input. In some implementations, the suggestion generator 123 may obtain signals describing the input.

The suggestion generator 123 uses the local ranking model 125 to obtain a probability for each of the candidate navigation suggestions. The suggestion generator 123 may provide the input as it has been typed, the candidate navigation suggestions and their respective signals to the local ranking model 125 as input. In some implementations user signals may also be provided with the input to the local ranking model 125. The local ranking model 125 provides as output, a probability score for each candidate navigation suggestion. The probability score represents a prediction of a likelihood of selection given the input. The suggestion generator 123 may provide top-scoring (i.e., candidate navigation suggestions with highest probabilities) as autocomplete suggestions. The browser 120 may present the autocomplete suggestions to the user as the user is entering text (e.g., typing, speaking, etc.) in the navigation text box. As the input the user enters changes, the suggestion generator 123 and the local ranking model 125 may re-calculate the autocomplete suggestions for the updated input, which means the local ranking model 125 must execute fast enough to make this practical. The suggestion generator 123 may be configured to combine navigation suggestions with search suggestions. The suggestion generator 123 may have various configurations, as explained in more detail with regard to FIG. 2 and FIG. 3.

The browser 120 may be configured to record selection events, e.g., in selection events 135. A selection event may include some or all of the autocomplete suggestions presented to the user, the text input for which the autocomplete suggestions were generated, user signals provided to the local ranking model 125, and an indication of which, if any, autocomplete suggestion was selected by the user. The selection events in the selection events 135 can be used to personalize the local ranking model 125. For example, a selection of an autocomplete suggestion can be used as a positive training example for the respective text input. In some implementations, with user permission, the selection events 135 may be shared with the server 140, e.g., stored as selection events 143. The signals collected in the selection events 135 may be determined by the browser 120 and can be updated via an update to the code for the browser 120.

The autocomplete suggestions identified using the local ranking model 125 may reduce the amount of computational resources of the client device 102 (e.g., computation time and/or memory space used) consumed by the browser 120 by programmatically providing one or more autocomplete suggestions to a user in order to more quickly and efficiently complete a task, such as a search or navigation, associated with use of the browser 120. For example, through the use of the autocomplete suggestions, the user may navigate directly to a relevant resource 182 without having a search result page generated and rendered, thereby decreasing the amount of computational resources consumed by the client device 102 (e.g., computational resources may be "freed up") and increasing the efficiency of the browser 120 itself. To maximize this benefit, the suggestion generator 123 must provide autocomplete suggestions with high precision and recall to. The local ranking model 125, which has higher recall and precision than methods that use static heuristics (static rules) to generate autocomplete suggestions, provides this benefit.

Figure 2:
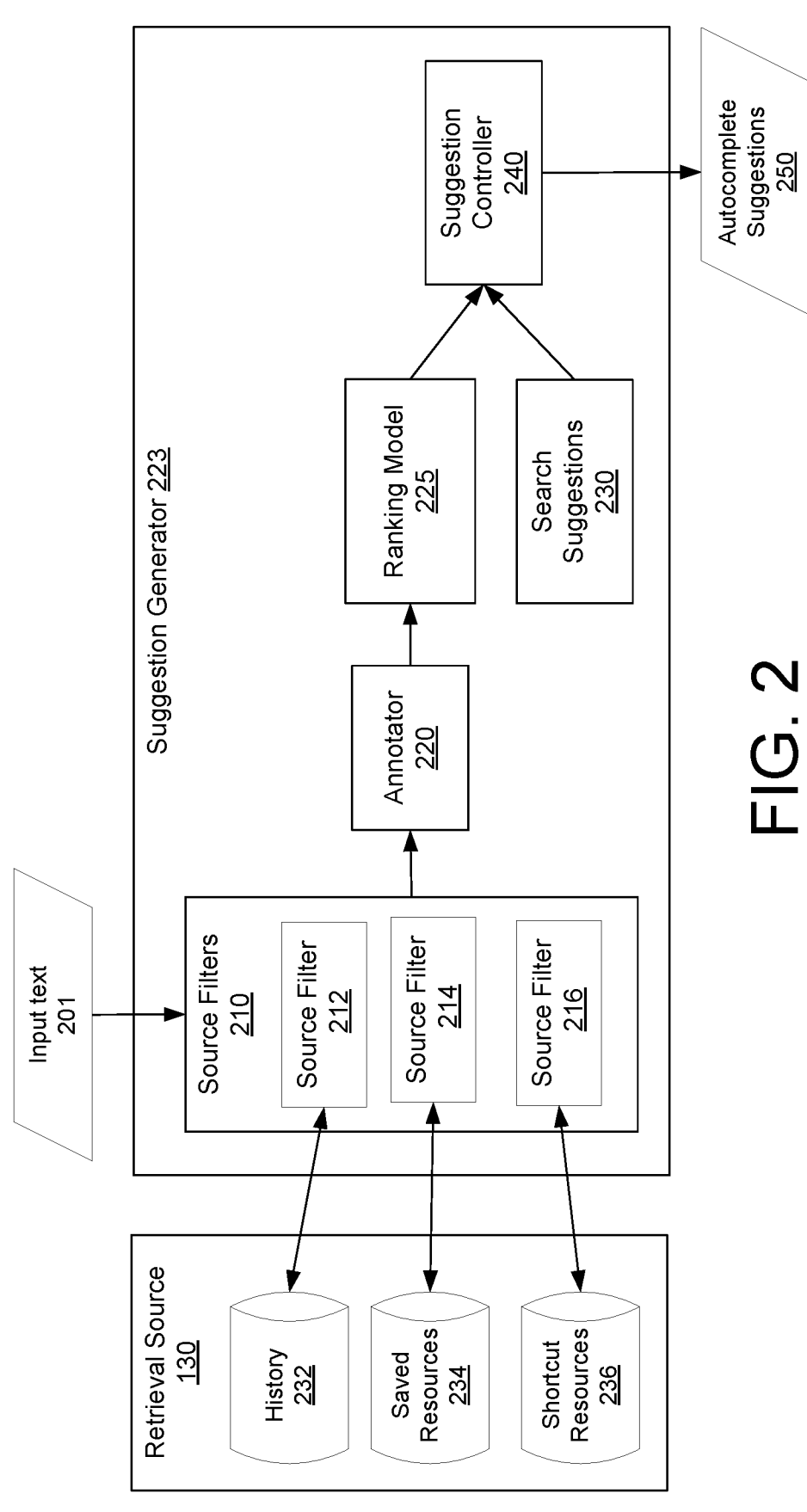
FIG. 2 illustrates a block diagram of a browser suggestion generator for a navigation text box, according to an implementation.

FIG. 2 illustrates a block diagram of an example browser suggestion generator 223 for a navigation text box, according to an implementation. The navigation text box may be referred to as a text input field configured for navigation to a resource or for navigation and search. The suggestion generator 223 is one example implementation of suggestion generator 123. The suggestion generator 223 is configured to use a ranking model 225 to score candidate navigation suggestions for an input text 201, and provide at least some (one or more) of the candidate navigation suggestions as autocomplete suggestions 250. The ranking model 225 is an example implementation of local ranking model 125. In the example of FIG. 2, the user has started entering text into the text input field provided by the browser for navigation or for navigation and search. Entry of the input text 201 can be accomplished via typing, voice-to-text, handwriting-to-text, or any other form of entry. The input text 201 may be a partial entry (partial input). Put another way, input text 201 may represent a partial word or a partial phrase. The suggestion generator 223 is configured to suggest completions for the input text 201, e.g., autocomplete suggestions 250. After receiving the input text 201, the suggestion generator 223 may be programmed (configured) to obtain candidate navigation suggestions from the resource retrieval source 130. The resource retrieval source 130 can include a browser history 232. The browser history 232 can also be referred to as a browser cache. Conventionally, a browser records the resource locators of resources (e.g., webpages) the user visits. The suggestion generator 223 may include or may use source filters 210 to determine which records in the resource retrieval sources 130 are relevant to the input text 201. For example, the source filters 210 may include a source filter 212 that corresponds to the browser history 232. The source filter 212 may identify candidate navigation suggestions in the browser history 232 by matching the title of a resource or the locator (e.g., URL) of the resource with the input text 201. The matching may be partial matching, e.g., matching only one of two or more terms in the input or matching a beginning of the input but not the entire input. The matching may be in a particular portion of the resource locator. For example, matching can be done in the domain portion, in a path portion of the resource locator, in a parameter portion, etc.

The resource retrieval sources 130 may also include saved resources 234. Records (entries) in the saved resources 234 may represent resources the user has expressly directed the browser 120 to save. Such saved resources are also referred to as bookmarks or favorites. The browser 120 provides menu options or other navigation elements that, once selected, cause the browser to navigate to the saved resource represented by the saved resource locator. The suggestion generator 223 may include source filter 214. The source filter 214 may be configured to identify candidate navigation suggestions in the saved resources 234 for the input text 201. Like source filter 212, source filter 214 may identify candidate navigation suggestions by determining whether the input text 201, or a portion of the input text 201, matches a title of a saved resource, a portion of the resource locator of a saved resource, a description of the saved resource (e.g., a description entered by the user), a directory name of the saved resource, metadata associated with a saved resource, etc. Matching can be full matching or partial matching.

The resource retrieval sources 130 may also include shortcut resources 236. Records (entries) in the shortcut resources 236 may represent resources the user previously selected from an autocomplete suggestion list in response to a text input. In some implementations, such an entry may include a count of the number of times the user selected that resource from a navigation suggestion for the text input. The suggestion generator 223 may include source filter 216. The source filter 216 may be configured to identify candidate navigation suggestions in the shortcut resources 236 for the input text 201. A resource in the shortcut resources 236 may be a candidate navigation suggestion when a title or portion of the resource locator matches the input text 201. A resource in the shortcut resources 236 may be a candidate navigation suggestion when a title or portion of the resource locator partially matches the input text 201. The source filters 210 may include additional source filters for other sources in the resource retrieval sources 130.

Although illustrated as three different sources in FIG. 2, in some implementations, the resource retrieval source 130 is an aggregation of resources from the browser history 232, the saved resources 234, and/or the shortcut resources 236. For example, the suggestion generator 223 may maintain a resource database that associates a resource (e.g., a resource locator) with signals about the resource (resource-specific signals), determined using one or more of the browser history 232, the saved resources 234, and the shortcut resources 236. Thus, the resource retrieval source 130 may be a single database updated from information obtained from browser history 232, saved resources 234, and/or shortcut resources 236. In such an implementation, the source filters 210 may include a single source filter 210 that identifies matching resources in the resource retrieval source 130. In some implementations, the job of identifying resources from the resource retrieval source 130 that match the source filters 210 may be performed by the annotator 220.

In some implementations, one or more of the source filters 210 may apply a rough ranking. For example, a source filter may be configured to return a specified number of resources from the resource retrieval source 130 that match the input text 201. Such source filters may apply a rough ranking, e.g., based on whether the input text 201 matched a title, a domain, a title and domain, which portion of the domain matched, whether the match is a partial match or a full match, etc. One or more of the source filters of the source filters 210 may use date for the rough ranking, e.g., with more recent entries receiving a boost. Such rough ranking may be needed when the input text 201 is short (one or two characters) but not as important for longer input text 201 because there will be fewer matches. Moreover, the ranking model 225 can handle many more candidate navigations than a rules-based approach, so a rough ranking may not be needed. Rough ranking is more important for prior art systems, which typically receive only a few (three, four, five, etc.) candidates from each source. In some disclosed implementations, suggestion generator 223 may request a large number (e.g., fifty, one hundred) from each source. This number may represent a cap (a limited number or maximum number), so if there are not that many matching resources, all matching resources (including partial matches) may be provided from a source filter as candidate navigation suggestions. In some implementations, one or more of the source filters 210 may provide signals for the candidate navigation suggestions. For example, the source filters 210 may indicate whether or not the title of a resource matched the input text 201, whether or not a portion of the domain matched the input text 201, which portion of the domain matched the input text 201, etc. As another example, source filter 214 may populate a signal indicating the candidate resource is bookmarked. As another example, the source filter 216 may populate a signal indicating the number of times the resource was selected and/or a signal indicating recency of the most recent select (e.g., within a day, within a week, within two weeks, within a month, etc.). In some implementations, the source filters 210 may not populate signals. In some examples, at least some of the signals may be stored in the entry of a resource in the resource retrieval source 130.

The suggestion generator 223 may include an annotator 220. The annotator 220 is configured to generate a feature vector for each candidate navigation suggestion, or in other words, for each candidate resource. The feature vector is an array of numbers describing different aspects/attributes of the resource. Each array position represents a different attribute and can be referred to as a signal. The feature vector can include a high number of features because the ranking model 225 can account for many (hundreds) of signals describing the candidate resources. The annotator 220 deduplicates the candidate navigation suggestions, so that if a resource comes from more than one source, it is represented by one feature vector. The annotator 220 may aggregate the signals (if any) determined by two or more source filters for a resource identified from two or more sources. Thus, the annotator 220 may populate the feature vector with signals, if any, determined by the source filters 210. The annotator 220 also obtains additional signals for the candidate navigation suggestions, filling out the respective feature vector for a candidate navigation suggestion. If a feature is not applicable to a particular resource, that signal may be a null or zero value in the feature vector.

The signals in the feature vector for a candidate resource can include resource-specific signals, which are independent of the input text 201. Resource-specific signals can include whether or not a resource is a saved resource (e.g., saved in saved resources 234). Resource-specific signals can include the count of saved resources containing the resource (e.g., when multiple saved resources point to the same resource). Resource-specific signals can include how much time has passed since the user last visited the resource (which may be expressed in hours, days, or categorized into time buckets). Resource-specific signals can include how many times the user has visited the resource. Resource-specific signals can include how many times the user has visited the resource by typing the resource locator into the navigation box. Resource-specific signals can include how many times the user has visited the resource in the morning, afternoon, and/or evening. Resource-specific signals can include how many times the user has visited the resource during working hours and/or outside of working hours. Resource-specific signals can include how many times the user has visited the resource on weekdays and/or on weekends. Resource-specific signals can include a length of the resource locator. Resource-specific signals can include an indication of the structure of the resource locator (e.g., whether or not the resource only consists of host name). Resource-specific signals can include quality scores of the resource, such as site engagement scores. Resource-specific signals can include a length of a most recent visit to the resource. Resource-specific signals can include visit ratio. The relative visit ratio may be determined as the number of visits to the resource versus the number of visits overall. This ratio can be limited by some measure of time (e.g., last week, last month, last 6 months, etc.). The relative visit ratio can indicate that a resource is more important to the user (or less important) than the number of visits might imply. In some implementations, one or more of the resource-specific signals may be bucketized. To expedite suggestion generation, resource-specific signals can be pre-computed by the suggestion generator 223 or the browser 120 and stored, e.g., as part of the entry for the resource in the resource retrieval source 130 (e.g., in a resource database). In such an implementation, the annotator 220 (or a source filter 210) may obtain the resource-specific signals from the resource retrieval source 130.

The signals in the feature vector for a candidate resource can include matching signals, which are dependent on the input text 201. Matching signals may measure a degree of match between the input text 201 and a title of the resource. Matching signals can include whether or not the title of a resource matched the input text 201. Matching signals can include what part of the title matched the input text 201. Matching signals can include whether a leading portion of the part of the title matched the input text 201. Matching signals may measure a degree of match between the input text 201 and a locator (URL) of the resource. Matching signals can include whether or not the locator (URL) of a resource matched the input text 201. Matching signals can include what part (e.g., domain, path, query, parameter, etc.) of the locator matched the input text 201. Matching signals may measure a degree of match between the input text 201 and different parts of a locator (URL) of the resource. Matching signals can include whether a leading portion of the part of the locator matched the input text 201. Matching signals can include whether (or how many times) the user selected the resource from autocomplete suggestions for the input text 201 or an input similar to input text 201 (e.g., an input that starts with the input text 201). Matching signals can include the number of terms from the input text 201 that match the candidate resource. For example, if the input is "abc xyz" the candidate resource may match just abc, or just xyz, or both abc and xyz. Matching signals may include a measure of a degree of match between the input text 201 and a title of the saved resource. Matching signals can include an indication of what part of the save resource title matches the input text 201.

The annotator 220 may also obtain user signals, generating a user feature vector. User signals describe aspects/attributes of the user without identifying the user. For example, user signals can include whether the user profile is a managed (e.g., enterprise) profile. User signals can include a country or state of the user. User signals can include whether the user is signed-in to the browser. User signals can include whether the user enables certain settings (e.g., whether sync is enabled). User signals can include the number of saved resources in saved resources 234, i.e., the size of the saved resources. User signals can include a size of (number of) the browser history. User signals can include a search-navigation ratio. The search-navigation ratio may represent the number of prior user selections of search suggestions versus the number of prior user selections of navigation suggestions from autocomplete suggestions. User signals can include a device type (e.g., mobile, desktop). User signals can include a popularity signal for a candidate navigation suggestion (i.e., a candidate resource), the annotator 220 may use that signal and may add additional signals. User signals can include a user cohort. A user cohort can be a classification of the user, e.g., as a power/casual user. The annotator 220 may also obtain input signals, such as the length of the input text 201.

The suggestion generator 223 includes ranking model 225. The ranking model 225 may take as input the respective feature vectors for the candidate navigation suggestions (which includes resource-specific signals and matching signals), the input text 201, and any other features obtained by the annotator 220 (e.g., user signals, input signals, etc.) and provide, as output, a probability scores for the candidate navigation suggestions. In other words, each candidate navigation suggestion gets a respective probability score from the ranking model 225. This probability score represents a prediction of a likelihood of selection, or in other words, how likely it is that the user will select the suggestion for this input text 201.

The suggestion generator 223 may include a suggestion controller 240. The suggestion controller 240 may be configured to select autocomplete suggestions 250 from among the candidate navigation suggestions based on the respective probability scores. For example, the suggestion controller 240 may select a predetermined number of the candidate navigation suggestions with highest probability scores and provide those candidates as autocomplete suggestions 250. The suggestion controller 240 may also be configured to select one or more search suggestions 230 for the autocomplete suggestions 250 for the input text 201. In some implementations, the suggestion controller 240 may be configured to predict a user intent for the input text 201, e.g., whether it is more likely that the user intends to search or navigate. This intent can be used to select either a candidate search suggestion or a candidate navigation suggestion as the default suggestion (the first suggestion) in the autocomplete suggestions 250.

In some implementations, the search suggestions 230 may also be scored using a ranking model that assigns a probability score representing the prediction of the likelihood of selection given the input. In one such implementation, the suggestion controller 240 may be configured to order the candidate navigation suggestions and the candidate search suggestions from one or more search suggestions 230 by the probability score and select the autocomplete suggestions 250 based on the order (e.g., the highest ranked candidates). In another such implementation, the suggestion controller 240 may be configured to determine which group (navigation suggestions or search suggestions) has higher quality, e.g., based on the number of suggestions with high probability scores, and either present the group with the higher-quality suggestions first or select more candidates from the group with higher quality. The suggestion generator 223 presents the selected autocomplete suggestions 250 for presentation to the user. The suggestion generator 223 can accomplish this quickly, around O(100) milliseconds.

Figure 3:
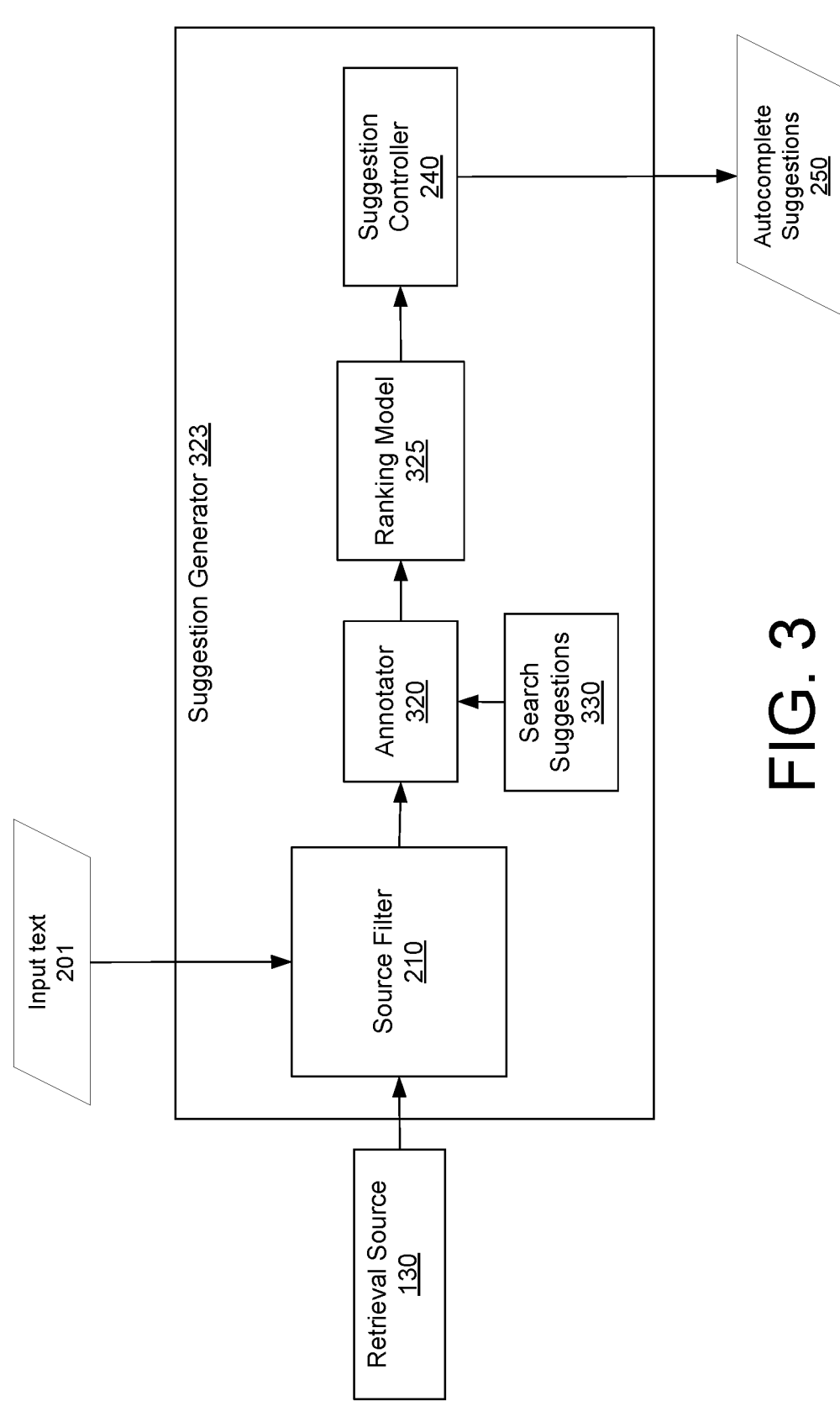
FIG. 3 illustrates a block diagram of a browser suggestion generator for a navigation text box, according to an implementation.

FIG. 3 illustrates a block diagram of a browser suggestion generator 323 for a navigation text box, according to an implementation. The suggestion generator 323 is one example implementation of suggestion generator 123. The suggestion generator 323 is similar to the suggestion generator 223 of FIG. 2, except that the annotator 320 may be configured to generate query vectors for candidate search suggestions and provide to the ranking model 325 the query vectors with the other inputs described above in FIG. 2. In other words, the ranking model 325 is similar to the ranking model 225 of FIG. 2, but is trained to score (generate a probability score for) the candidate navigation suggestions and the candidate search suggestions 330. The query vectors for the candidate search suggestions 330 may include signals that differ from the resource feature vector. In the example of FIG. 3, the suggestion controller 240 can directly compare search suggestions with navigation suggestions and order the suggestions using the respective probability scores, providing a small number (e.g., four, five, six) of the suggestions as autocomplete suggestions 250. Like the suggestion generator 223 of FIG. 2, the browser history suggestion generator 323 can accomplish this quickly, around O(100) milliseconds.

Figure 4:
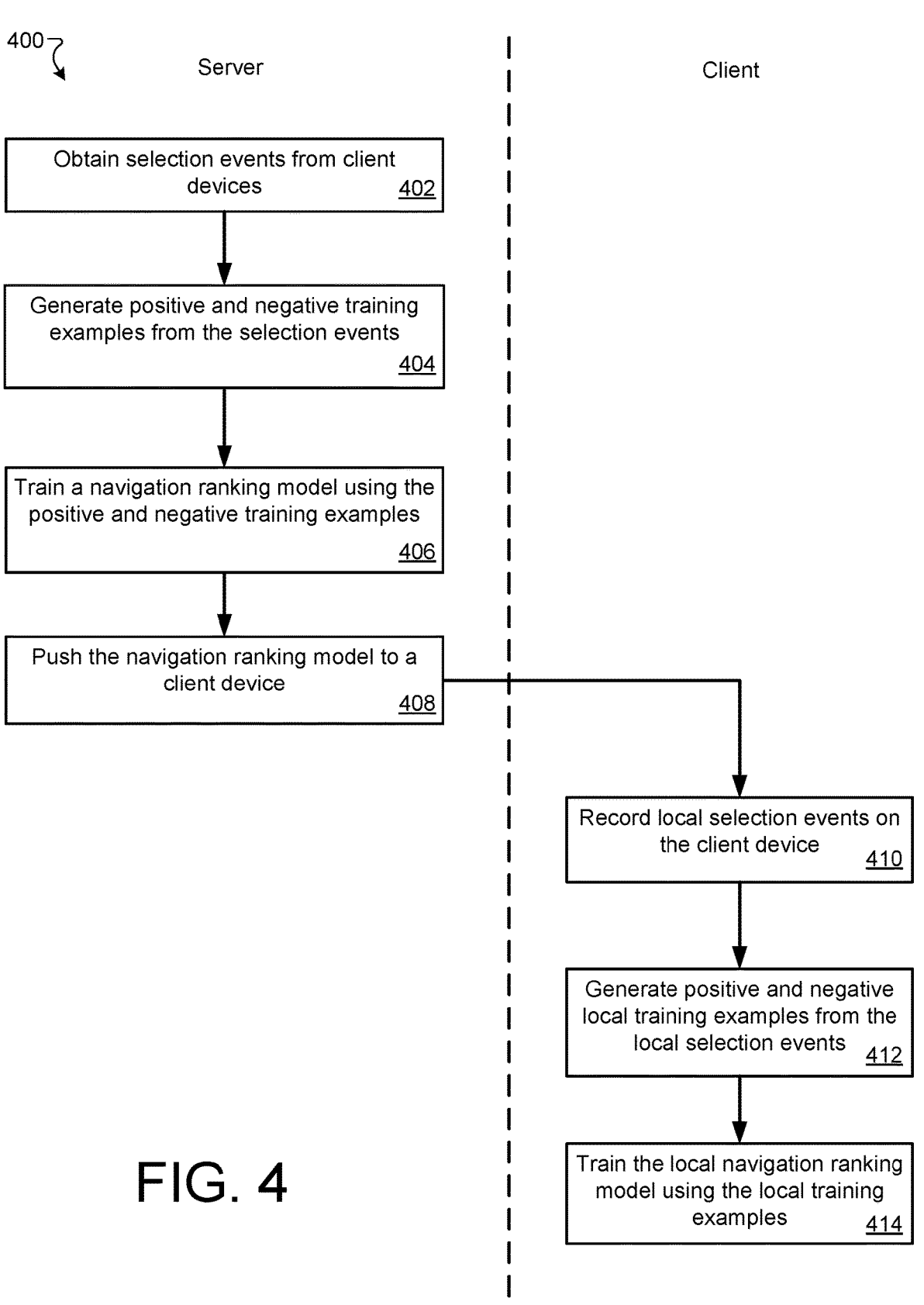
FIG. 4 illustrates a flowchart of an example method of training a navigation suggestion ranking model, according to an implementation.

FIG. 4 is a flowchart illustrating an example method 400 for training a resource ranking model, according to some implementations. The method 400 may represent operations of a system (e.g., server 140) and/or a browser (e.g., browser 120). Although the method 400 of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion. In some implementations, the operations of FIG. 4 are executed by the server 140. In some implementations, the operations of FIG. 4 are executed by the browser 120. In some implementations, the operations of FIG. 4 are executed by a combination of the browser 120 and the server 140 (e.g., using federated learning). The method 400, or portions thereof, can be performed an initial time, any time additional signals have been added to the selection events so that the model can learn how to appropriately weight the additional signals, or as a fine-tuning process.

Operation 402 includes acquiring selection events from a plurality of client devices. The selection events, such as selection events 135, are generated from autocomplete suggestions provided in response to entry of text in a navigation text box. The selection events include signals for navigation suggestions and data indicating which, if any, of the navigation suggestions was selected by the user. Operation 404 includes generating positive and negative training examples from the selection events. For example, in some implementations, the method 400 uses listwise training. In listwise training the model considers N candidates at a time and decides an optimal order of the list. In such an implementation, each selection event is a labeled training example with each autocomplete suggestion being labeled as either selected or not selected. In some implementations the order of a selected suggestion in the list may be randomized to combat selection bias. Selection bias occurs when users are more likely to pick a suggestion that appears at the top of the list. Randomizing the order of the suggestions in the list can help combat the bias. A suggestion labeled as selected is a positive training example and a suggestion labeled as not selected is a negative training example. In some implementations, the suggestions in the selection event may include search suggestions in addition to navigation suggestions to train the model to rank both search and navigation autocomplete suggestions.

In some implementations, the method 400 may use pointwise training. In pointwise training the model predicts a score for each suggestion in the suggestion event separately. In this example, a selected suggestion is a positive training example that should receive a high probability label, meaning that the suggestion has a high predicted likelihood of selection given the input. Similarly, suggestions that are not selected are negative training examples and should receive a low probability, meaning that the suggestion has a low predicted likelihood of selection given the input. In some implementations, the method 400 may use pairwise training. In pairwise training, two resource suggestions from the same event are given to the model as input and the model predicts the probability of one of the suggestions being ranked higher than the other.

In some implementations, the system may randomly select positive training examples from the selection events. In some implementations, the system may limit the number of training examples used for any one user (i.e., use a maximum number of selection events from a unique user profile) to prevent undue influence on the navigation suggestion ranking model 145 by any one user, e.g., using an anonymized client identifier.

Operation 406 includes training the navigation ranking model using the labeled training examples. Over many (thousands, millions) of selection events the navigation suggestion ranking model learns how to weight the signals so that the navigation suggestion ranking model closely recreates the probabilities represented in the selection events. Operation 408 includes pushing the trained navigation ranking model to client devices. This may be done as part of an update to the browser. Once the trained navigation ranking model has been loaded on the client device the model may be used by the browser to rank and select navigation suggestions used as autocomplete selections for an input.

In some implementations, a client device may personalize the navigation suggestion ranking model by further training the model on-device using local selection events. This personalization is optional. In implementations that provide for personalization, operation 410 may include recording selection events on the client device. These are local selection events, meaning that they record the behavior of a user on the device. These events can be recorded and kept on-device. In some implementations, the selection events can be associated with a user profile. For example, a first directory location may be used to store first local selection events for a first user of the client device and a second directory location may be used to store second local selection events for a second user of the client device, where the first user and the second user have different user profiles. In such an implementation, each user may have their own instance of the navigation suggestion ranking model. Operation 412 includes generating labeled training examples from the local selection events. This process is similar to operation 404. Operation 414 includes using the labeled training examples to train the local instance of the navigation suggestion ranking model. After operation 414 the local instance of the navigation suggestion ranking model is personalized for the user associated with the client device and/or the user profile. Operations 410 and 414 can be performed periodically, e.g., when a sufficient number of local selection events have been recorded at the client device.

FIG. 5 is a flowchart of an example method 500 of using a navigation suggestion ranking model, according to an implementation. Although the method 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion. Method 500 may be performed by a browser, such as browser 120 of FIG. 1, to provide resource locators as navigation suggestions in response to user input in a text input field used for navigation or a text input field used for navigation and search (e.g., an omnibox). Thus, method 500 is understood to occur as the user is entering text, e.g., via typing, voice-to-text, handwriting to text, etc., in the navigation text box. Method 500 represents a guided human-machine interaction process that assists a user with a search for resources, e.g., resources available over the Internet.

Operation 502 includes receiving the input in the navigation text box. The navigation text box is a text box used at least for navigation to a particular resource, e.g., one of the resources 182 available from a resource provider 180. In some implementations, the navigation text box is a multi-purpose text box used for navigation and for search. In such an implementation, the autocomplete suggestions can include suggested searches and suggested resource locators.

The input can be a partial input, or in other words a partial term or phrase. Put another way, the input may not be a completed input that represents all characters the user intends to enter.

Operation 504 includes obtaining candidate resources (resource locators) for the input. The candidate resources can be obtained from a single retrieval source, e.g., a resource database generated by the browser for autocomplete suggestions. The candidate resources can be obtained from at least two retrieval sources. The retrieval sources can include a browser history and bookmarks. The retrieval sources can include a shortcut history. The number of candidate resources obtained from a retrieval source can be large, e.g., thirty, forty, fifty, hundreds, etc. A relevance score is not needed from the source, so any matching resource can be considered. There may be a cap on the number of candidate resources obtained from a source (especially if the input is only one or two characters). In implementations that obtain candidate resources from multiple retrieval sources, it is possible that the same candidate resource is obtained from two or more of the retrieval sources, so obtaining candidate resource locators may include deduplicating the candidate resource locators.

Operation 506 includes determining, for each of the candidate resource locators, respective features. The respective features are signals that describe attributes of the candidate resource locators. Example features can include one or more of which portion(s) of the resource locator match the input (e.g., does the input match a query portion? Does the input match a path portion? Does the input match a leading portion?, etc.), whether a title of the resource matches the input, whether or not the resource is a saved (bookmarked) resource, the number of times the resource has been visited via the navigation text box (the omnibox), the number of times the resource has been selected based on this input, a recency of a last visit to the resource, a total number of times the resource has been visited, number of visits in various periods of time, length of the resource locator, etc. These respective resource features are represented as numbers and do not reveal personal information about a user.

Operation 508 includes obtaining user features. The user features are signals that describe attributes of a user. The user features may be generalized to avoid using personalized information. User features can include a total number of saved resources (bookmarks) or a categorization of the number of saved resources (e.g., heavy bookmark user based on at least a threshold number of saved resources, categories representing buckets (such as less than 15 saved resources, 16-50 saved resources, >50 saved resources, etc.). User features can include total number of unique resource locators in a browser history, platform type (mobile/desktop), device type, whether a user is categorized as an enterprise user or a home user, etc. Other user features can be identified and obtained. Additionally, the user features can be determined outside of method 500, e.g., operation 508 can occur prior to receipt of the input. In some implementations, to speed execution of method 500, the user features can be determined and stored as part of a user profile.

Operation 510 includes providing the input, the candidate resource locators (candidate resources) and the features (user, resource, and others) to a trained navigation suggestion ranking model. The model may be trained, e.g., as described in FIG. 4. Operation 512 includes obtaining a respective probability score for each of the candidate resources from the navigation suggestion ranking model. The scores represent a prediction of a likelihood of selection by the user in response to the input and are based on weights assigned to the features. A higher probability score for a candidate resource indicates a higher rank for the candidate resource.

Operation 514 providing at least some (one or more) of the candidate resource locators as autocomplete suggestions for the input. The candidate resource locators are selected based on the respective probability scores. For example, candidate resources with highest probability scores may be selected. The number of candidates selected may be fixed. The number of candidates selected may be based on how the probabilities compare with probabilities determined for candidate searches. The number of candidates selected may be based on properties of the input.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

Clause 1. A method comprising: receiving an input in a navigation text box; obtaining candidate navigation suggestions from a retrieval source for the input; obtaining respective signals for the candidate navigation suggestions; obtaining respective probability scores for the candidate navigation suggestions by providing the input, the candidate navigation suggestions, and the respective signals to a navigation suggestion ranking model, the respective probability scores representing a prediction of a likelihood of selection; and providing at least some candidate navigation suggestions based on their respective probability scores and as autocomplete suggestions for the input.

Clause 2. The method of clause 1, further comprising: obtaining user signals describing a user, wherein obtaining the respective probability scores includes providing the user signals with the input, the candidate navigation suggestions, and the respective signals to the navigation suggestion ranking model.

Clause 3. The method of clause 2, the user signals including: a user cohort determined for the user, a device type, a quantity of bookmarks saved on a client device, a size of a browser history, or a search-navigation ratio, the search-navigation ratio representing, for a number of prior user selections of autocomplete suggestions in the navigation text box, a number of search suggestions selected and a number of navigation suggestions selected.

Clause 4. The method of any of clause 1 to 3, further comprising: receiving a selection of an autocomplete suggestion of the autocomplete suggestions; recording a selection event, the selection event including the respective signals, the candidate navigation suggestions, and the autocomplete suggestion selected; and training the navigation suggestion ranking model using the selection event as labeled training data.

Clause 5. The method of clause 4, wherein recording the selection event includes recording whether the selection is of a search suggestion or a candidate navigation suggestion.

Clause 6. The method of clause 5, wherein a quantity of the at least some candidate navigation suggestions provided is determined by the navigation suggestion ranking model.

Clause 7. The method of any of clause 1 to 6, wherein obtaining the respective signals further comprises: deduplicating the candidate navigation suggestions from the retrieval source; and annotating at least some of the candidate navigation suggestions with additional signals.

Clause 8. The method of any of clause 1 to 7, the respective signals including, for a candidate navigation suggestion of the candidate navigation suggestions, a relative visit ratio.

Clause 9. The method of any of clause 1 to 8, wherein a number of candidate navigation suggestions obtained from the retrieval source is an order of magnitude more than a number of candidate navigation suggestions provided for a rules-based ranking of candidate navigation suggestions.

Clause 10. The method of any of clause 1 to 9, further comprising: providing at least one search suggestion with the at least some candidate navigation suggestions.

Clause 11. The method of clause 10, wherein at least one of the candidate navigation suggestions is presented ahead of the at least one search suggestion based on the respective probability scores.

Clause 12. The method of any of clause 1 to 11, wherein the respective signals include a score measuring a degree of match between the input and a title of the candidate navigation suggestion or a degree of match between the input and a domain of the candidate navigation suggestion.

Clause 13. The method of any of clause 1 to 12, wherein the navigation suggestion ranking model runs on a client device.

Clause 14. A method comprising: collecting selection events from client devices, the selection events recording selected autocomplete suggestions and signals of autocomplete suggestions provided for partial inputs in a navigation text box, the autocomplete suggestions including navigation suggestions; and training a navigation suggestion ranking model using the selection events, where a selected suggestion of a selection event of the selection events represents a positive example for the autocomplete suggestions of the selection event.

Clause 15. The method of clause 14, wherein training the navigation suggestion ranking model uses listwise training.

Clause 16. The method of clause 15, the listwise training includes changing an order of the selected suggestion in a list of the autocomplete suggestions.

Clause 17. The method of any of clause 14 to 16, wherein a limited number of selection events is collected from any one user.

Clause 18. The method of any of clause 14 to 17, wherein the trained navigation suggestion model is pushed to user devices.

Clause 19. The method of any of clause 14 to 18, wherein the autocomplete suggestions include search suggestions.

Clause 20. The method of any of clause 14 to 19, the signals including, for an autocomplete suggestion of the autocomplete suggestions, a relative visit ratio.

Clause 21. A method comprising: receiving a partial input in a text box used for navigation and search; obtaining candidate navigation suggestions from a retrieval source for the partial input; obtaining respective signals for the candidate navigation suggestions; obtaining respective probability scores for the candidate navigation suggestions by providing the partial input, the candidate navigation suggestions, and the respective signals to a navigation suggestion ranking model, the respective probability scores representing a prediction of a likelihood of selection; providing at least some candidate navigation suggestions based on their respective probability scores and as autocomplete suggestions for the partial input; receiving a selection of an autocomplete suggestion of the autocomplete suggestions; and navigating to a resource represented by the autocomplete suggestion.

Clause 22. The method of clause 21, further comprising: obtaining user signals describing a user, wherein obtaining the respective probability scores includes providing the user signals with the input, the candidate navigation suggestions, and the respective signals to the navigation suggestion ranking model.

Clause 23. The method of clause 22, the user signals including: a user cohort determined for the user, a device type, a quantity of bookmarks saved on a client device, a size of a browser history, or a search-navigation ratio, the search-navigation ratio representing, for a number of prior user selections of autocomplete suggestions in the navigation text box, a number of search suggestions selected and a number of navigation suggestions selected.

Clause 24. The method of any of clause 21 to 23, further comprising: receiving a selection of an autocomplete suggestion of the autocomplete suggestions; recording a selection event, the selection event including the respective signals, the candidate navigation suggestions, and the autocomplete suggestion selected; and training the navigation suggestion ranking model using the selection event as labeled training data.

Clause 25. The method of clause 24, wherein recording the selection event includes recording whether the selection is of a search suggestion or a candidate navigation suggestion.

Clause 26. The method of clause 25, wherein a quantity of the at least some candidate navigation suggestions provided is determined by the navigation suggestion ranking model.

Clause 27. The method of any of clause 21 to 26, wherein obtaining the respective signals further comprises: deduplicating the candidate navigation suggestions from the retrieval source; and annotating at least some of the candidate navigation suggestions with additional signals.

Clause 28. The method of any of clause 21 to 27, the respective signals including, for a candidate navigation suggestion of the candidate navigation suggestions, a relative visit ratio.

Clause 29. The method of any of clause 21 to 28, wherein a number of candidate navigation suggestions obtained from the retrieval source is an order of magnitude more than a number of candidate navigation suggestions provided for a rules-based ranking of candidate navigation suggestions.

Clause 30. The method of any of clause 21 to 29, further comprising: providing at least one search suggestion with the at least some candidate navigation suggestions.

Clause 31. The method of clause 30, wherein at least one of the candidate navigation suggestions is presented ahead of the at least one search suggestion based on the respective probability scores.

Clause 32. The method of any of clause 12 to 31, wherein the respective signals include a score measuring a degree of match between the input and a title of the candidate navigation suggestion or a degree of match between the input and a domain of the candidate navigation suggestion.

Clause 33. The method of any of clause 21 to 32, wherein the navigation suggestion ranking model runs on a client device.

Clause 34. A system comprising: at least one processor; and a memory storing instructions that, when executed by the at least one processor, cause the system to perform the method of any of clause 1 to clause 33.

What is claimed is:

1. A non-transitory computer-readable medium storing instructions that, when executed by at least one processor, cause a computing device to perform operations comprising:
receiving an input in a navigation text box, the navigation text box being configured to receive text corresponding to a resource locator for a resource;
obtaining candidate navigation suggestions from a retrieval source for the input, the retrieval source representing data related to a browsing history for a user profile;
obtaining respective signals for the candidate navigation suggestions;
obtaining respective probability scores for the candidate navigation suggestions by providing the input, the candidate navigation suggestions, and the respective signals to a navigation suggestion ranking model, the respective probability scores representing a prediction of a likelihood of selection;
providing at least some candidate navigation suggestions based on their respective probability scores as autocomplete suggestions for the input; and
providing at least one search suggestion with the at least some candidate navigation suggestions,
wherein at least one of the candidate navigation suggestions is presented ahead of the at least one search suggestion based on the respective probability scores.

2. The non-transitory computer-readable medium of claim 1, the operations further comprising:
obtaining user signals describing a user,
wherein obtaining the respective probability scores includes providing the user signals with the input, the candidate navigation suggestions, and the respective signals to the navigation suggestion ranking model.

3. The non-transitory computer-readable medium of claim 2, the user signals including:
a user cohort determined for the user,
a device type,
a quantity of bookmarks saved on a client device,
a size of a browser history, or
a search-navigation ratio, the search-navigation ratio representing, for a number of prior user selections of the autocomplete suggestions in the navigation text box, a number of search suggestions selected and a number of navigation suggestions selected.

4. The non-transitory computer-readable medium of claim 1, the operations further comprising:
receiving a selection of an autocomplete suggestion of the autocomplete suggestions;
recording a selection event, the selection event including the respective signals, the candidate navigation suggestions, and the autocomplete suggestion selected; and
training the navigation suggestion ranking model using the selection event as labeled training data.

5. The non-transitory computer-readable medium of claim 4, wherein recording the selection event includes recording whether the selection is of a search suggestion or a candidate navigation suggestion.

6. The non-transitory computer-readable medium of claim 1, wherein a quantity of the at least some candidate navigation suggestions provided is determined by the navigation suggestion ranking model.

7. The non-transitory computer-readable medium of claim 1, wherein obtaining the respective signals further comprises:
deduplicating the candidate navigation suggestions from the retrieval source; and
annotating at least some of the candidate navigation suggestions with additional signals.

8. The non-transitory computer-readable medium of claim 1, the respective signals including, for a candidate navigation suggestion of the candidate navigation suggestions, a relative visit ratio.

9. The non-transitory computer-readable medium of claim 1, wherein a number of candidate navigation suggestions obtained from the retrieval source is an order of magnitude more than a number of candidate navigation suggestions provided for a rules-based ranking of the candidate navigation suggestions.

10. The non-transitory computer-readable medium of claim 1, wherein the respective signals include a score measuring a degree of match between the input and a title of a candidate navigation suggestion of the candidate navigation suggestions or a degree of match between the input and a domain of the candidate navigation suggestion.

11. The non-transitory computer-readable medium of claim 1, wherein the navigation suggestion ranking model runs on a client device.

12. A computing device comprising:
at least a processor; and
a memory storing instructions that, when executed by the processor, cause the computing device to perform operations including:
receiving an input in a navigation text box, the navigation text box being configured to receive text corresponding to a resource locator for a resource;
obtaining candidate navigation suggestions from a retrieval source for the input, the retrieval source representing data related to a browsing history for a user profile;
obtaining respective signals for the candidate navigation suggestions;
obtaining respective probability scores for the candidate navigation suggestions by providing the input, the candidate navigation suggestions, and the respective signals to a navigation suggestion ranking model, the respective probability scores representing a prediction of a likelihood of selection;

providing at least some candidate navigation suggestions based on their respective probability scores as autocomplete suggestions for the input; and providing at least one search suggestion with the at least some candidate navigation suggestions, wherein at least one of the candidate navigation suggestions is presented ahead of the at least one search suggestion based on the respective probability scores.

13. The computing device of claim 12, the operations further comprising:

obtaining user signals describing a user, wherein obtaining the respective probability scores includes providing the user signals with the input, the candidate navigation suggestions, and the respective signals to the navigation suggestion ranking model.

14. The computing device of claim 13, the user signals including:

a user cohort determined for the user, a device type, a quantity of bookmarks saved on a client device, a size of a browser history, or a search-navigation ratio, the search-navigation ratio representing, for a number of prior user selections of the autocomplete suggestions in the navigation text box, a number of search suggestions selected and a number of navigation suggestions selected.

15. The computing device of claim 12, the operations further comprising:

receiving a selection of an autocomplete suggestion of the autocomplete suggestions;

recording a selection event, the selection event including the respective signals, the candidate navigation suggestions, and the autocomplete suggestion selected; and training the navigation suggestion ranking model using the selection event as labeled training data.

16. The computing device of claim 15, wherein recording the selection event includes recording whether the selection is of a search suggestion or a candidate navigation suggestion.

17. The computing device of claim 12, wherein a quantity of the at least some candidate navigation suggestions provided is determined by the navigation suggestion ranking model.

18. The computing device of claim 12, wherein obtaining the respective signals further comprises:

deduplicating the candidate navigation suggestions from the retrieval source; and annotating at least some of the candidate navigation suggestions with additional signals.

19. The computing device of claim 12, the respective signals including, for a candidate navigation suggestion of the candidate navigation suggestions, a relative visit ratio.

20. The computing device of claim 12, wherein a number of candidate navigation suggestions obtained from the retrieval source is an order of magnitude more than a number of candidate navigation suggestions provided for a rules-based ranking of the candidate navigation suggestions.

* * * * *